(12) United States Patent
Kim

(10) Patent No.: US 10,877,565 B2
(45) Date of Patent: Dec. 29, 2020

(54) METHOD AND SYSTEM FOR CONTROLLING PLAY OF MULTIMEDIA CONTENT

(71) Applicant: NAVER Corporation, Seongnam-si (KR)

(72) Inventor: Dae Hwang Kim, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 0 days.

(21) Appl. No.: 15/898,886

(22) Filed: Feb. 19, 2018

(65) Prior Publication Data

US 2018/0239437 A1  Aug. 23, 2018

(30) Foreign Application Priority Data

Feb. 20, 2017  (KR) ................. 10-2017-0022474

(51) Int. Cl.
*G06F 3/00* (2006.01)
*G06F 3/01* (2006.01)
*G06F 3/0488* (2013.01)
*G06F 3/0481* (2013.01)
*G06F 3/0484* (2013.01)
*G11B 27/10* (2006.01)
*G11B 27/34* (2006.01)

(52) U.S. Cl.
CPC ............ *G06F 3/017* (2013.01); *G06F 3/0481* (2013.01); *G06F 3/0488* (2013.01); *G06F 3/04847* (2013.01); *G06F 3/04883* (2013.01); *G06F 3/04886* (2013.01); *G11B 27/102* (2013.01); *G11B 27/34* (2013.01); *G06F 2203/04808* (2013.01)

(58) Field of Classification Search
CPC ................................................ G06F 2203/011
See application file for complete search history.

(56) References Cited

U.S. PATENT DOCUMENTS

| 10,140,086 B2* | 11/2018 | Hong ...................... G06F 3/165 |
| 10,430,067 B2* | 10/2019 | Patel ..................... G06F 3/0484 |
| 2015/0067601 A1* | 3/2015 | Bernstein .............. G06F 3/0488 715/823 |
| 2016/0018981 A1* | 1/2016 | Amerige ............. G06F 3/04883 715/863 |
| 2016/0198247 A1* | 7/2016 | Cheney ............... H04R 31/006 381/334 |
| 2016/0349986 A1* | 12/2016 | Itou ..................... G06F 3/04883 |
| 2018/0143800 A1* | 5/2018 | Lu ....................... G06F 3/04812 |

FOREIGN PATENT DOCUMENTS

| JP | 2011141632 A | 7/2011 |
| KR | 1020120077504 A | 7/2012 |
| KR | 20120107289 A | 10/2012 |
| KR | 20130052749 A | 5/2013 |

OTHER PUBLICATIONS

Korean Office Action issued in corresponding to Korean patent application No. 10-2017-0022474, dated Apr. 2, 2018.

* cited by examiner

*Primary Examiner* — Di Xiao
(74) *Attorney, Agent, or Firm* — Greer Burns & Crain Ltd.

(57) ABSTRACT

Provided is a method and system for controlling play of multimedia content. A user interface method includes determining a user gesture for a single object configured as a user interface on a user interface screen for controlling play of content; and changing a previous function specified for the object with a function corresponding to the user gesture.

11 Claims, 10 Drawing Sheets

METHOD AND SYSTEM FOR CONTROLLING PLAY OF MULTIMEDIA CONTENT

CROSS-REFERENCE TO RELATED APPLICATION(S)

This application claims priority under 35 U.S.C. § 119 to Korean Patent Application No. 10-2017-0022474 filed on Feb. 20, 2017, in the Korean Intellectual Property Office (KIPO), the entire contents of which are incorporated herein by reference.

BACKGROUND OF THE INVENTION

Field of the Invention

One or more example embodiments relate to a user interface technique for controlling play of multimedia content.

Description of Related Art

Interest in mobile devices for playing multimedia contents is on the increase. Mobile devices may include, for example, an MP3 player, a portable multimedia player (PMP), a smartphone, a wearable device, and the like. A user may enjoy multimedia contents using a mobile device without restriction on a place.

For example, a multimedia content processing method and system for playing multimedia content provided from a host device is disclosed in Korean Patent Publication No. 10-2012-0077504, published on Jul. 10, 2012.

SUMMARY OF THE INVENTION

One or more example embodiments provide a user interface method and system that may make various user actions, for example, user gestures and execution functions interact with a single button.

One or more example embodiments also provide a user interface method and a system that may provide various functions associated with control of multimedia content using a single function.

According to an aspect of at least one example embodiment, there is provided a user interface method using a computer for interfacing with a user through a user interface screen, the method including determining a user gesture for a single object displayed on the user interface screen and configured as a user interface for controlling play of content; and changing a previous function specified for the object with a function corresponding to the user gesture.

A desired reference area and the object displayed on the reference area may be included in a user interface screen for controlling the play of the content, and the determining of the user gesture may include determining the user gesture based on the reference area.

A desired reference area and the object displayed on the reference area may be included in a user interface screen for controlling the play of the content, and the changing of the previous function may include changing a display state of the object in response to the user gesture while maintaining the reference area.

The changing of the display state of the object may include applying, to the object, an image change corresponding to at least one of a movement direction, a movement distance, and a movement speed of the user gesture.

The changing of the display state of the object may include displaying a symbol representing the changed function of the object.

The user interface method may further include controlling the play of the content based on the changed function of the object.

The user interface method may further include changing again the changed function with the previous function of the object in response to the execution of the changed function.

The determining of the user gesture may include measuring a distance between initial touch coordinates of an event received in response to a touch input on the object and current touch coordinates; determining whether an event received after a point in time at which the measured distance is greater than or equal to a threshold is an end event corresponding to a touch release; measuring a current touch movement speed in response to the event received after the point in time at which the measured distance is greater than or equal to the threshold being determined to not be the end event; and classifying a type of the user gesture as a drag in response to the current touch movement speed being zero.

The determining of the user gesture may include verifying a previous touch movement speed of the end event in response to the event received after the point in time at which the measured distance is greater than or equal to the threshold being determined to be the end event; and classifying the type of the user gesture as a flick or a swipe in response to the previous touch movement speed not being zero.

The classifying of the type of the user gesture as the flick or the swipe may include classifying the type of the user gesture as the flick in response to an increase in a speed change between the previous touch movement speed and the current touch movement speed; and classifying the type of the user gesture as the swipe in response to a decrease in the speed change between the previous touch movement speed and the current touch movement speed.

According to an aspect of at least one example embodiment, there is provided a non-transitory computer-readable recording medium storing instructions that, when executed by a processor, cause the processor to perform a user interface with a user through a user interface screen, including determining a user gesture for a single object configured as a user interface for controlling play of content; and changing a previous function specified for the object with a function corresponding to the user gesture.

According to an aspect of at least one example embodiment, there is provided a user interface system configured as a computer for interfacing with a user through a user interface screen, the user interface system including at least one processor configured to execute non-transitory computer-readable instructions. The at least one processor includes a gesture determiner configured to determine a user gesture performed on a single object displayed on the user interface screen and configured as a user interface for controlling play of content; and a changer configured to change a previous function specified for the object with a function corresponding to the user gesture.

According to some example embodiments, it is possible to reduce the waste of space occurring to provide a separate button or an additional search window, for example, a seek bar, on a limited area by associating various functions associated with control of content with a single button through interaction between a single action and various actions and execution functions.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

Figure 1:
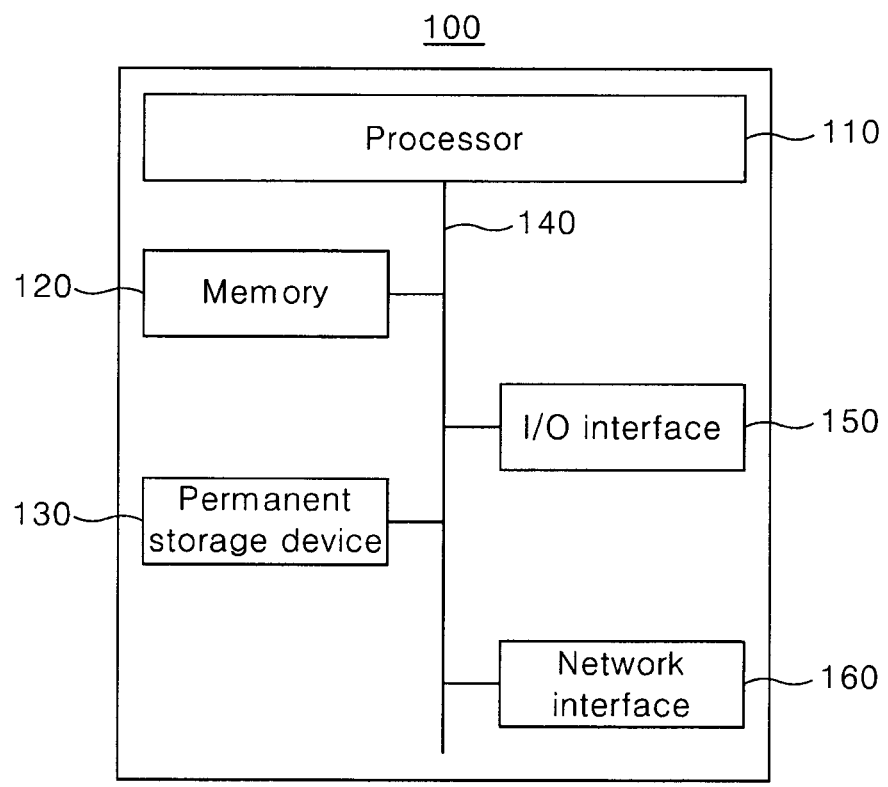
FIG. 1 is a diagram illustrating an example of a configuration of a computer system according to one embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION OF THE INVENTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

The example embodiments relate to a user interface technique for controlling play of multimedia content, and more particularly, to a user interface method and system that may provide various functions associated with control of multimedia content using a single button.

The example embodiments disclosed herein may make various user actions and execution functions interact with a single button and may achieve many advantages, such as cost reduction, efficiency, convenience, diversity, etc.

The term "multimedia content" used herein may inclusively indicate information service contents having a variety of information formats, for example, a text, a sound, and an image, and may include audio content, such as music and various types of sound guides, and video content, such as a moving picture and three-dimensional (3D) image content.

FIG. 1 is a diagram illustrating an example of a configuration of a computer system according to one embodiment. For example, a user interface system according to one embodiment may be configured through a computer system 100 of FIG. 1. Referring to FIG. 1, the computer system 100 includes a processor 110, a memory 120, a permanent storage device 130, a bus 140, an input/output (I/O) interface 150, and a network interface 160 as components to implement the user interface method.

The processor 110 may include a device capable of processing a sequence of instructions or may be a part of the device. The processor 110 may include, for example, a computer processor, a processor in a moving device or another electronic device, and/or a digital processor. The processor 110 may be included in, for example, a server computing device, a server computer, a series of server computers, a server farm, a cloud computer, a content platform, a mobile computing device, a smartphone, a tablet, a set-top box, and a media player. The processor 110 may access the memory 120 through the bus 140.

The memory 120 may include a volatile memory, a permanent memory, a virtual memory, and/or another type of memory used by the computer system 100 or to store information output by the computer system 100. The memory 120 may include, for example, random access memory (RAM) and/or dynamic RAM (DRAM). The memory 120 may be used to store desired information, such as state information of the computer system 100. The memory 120 may be used to store instructions of the computer system 100 that include instructions for controlling, for example, play of audio content. If necessary or if appropriate, the computer system 100 may include at least one processor 110.

The bus 140 may include a communication based structure that enables interactions between various components of the computer system 100. The bus 140 may transport data between the components of the computer system 100, for example, between the processor 110 and the memory 120. The bus 140 may include a wireless and/or wired communication medium between the components of the computer system 100, and may include parallel, serial, or other topology arrangements.

The permanent storage device 130 may include components, such as a memory or another permanent storage device, as used by the computer system 100 to store data during a desired extended period, for example, compared to the memory 120. The permanent storage device 130 may include a nonvolatile main memory as used by the processor 110 within the computer system 100. The permanent storage device 130 may include, for example, a flash memory, a hard disk, an optical disk, or another computer-readable recording medium.

The I/O interface 150 may include interfaces for a keyboard, a mouse, a voice instruction input, a display, and/or another input device or output device. Input associated with configuration instructions and/or control of audio content may be received through the I/O interface 150.

The network interface 160 may include at least one interface for networks, such as a near field network or the Internet. The network interface 160 may include interfaces for wired or wireless accesses. Configuration instructions may be received through the network interface 160. Information associated with audio content may be received or transmitted through the network interface 160.

Also, according to other example embodiments, the computer system 100 may include additional number of components than the number of components shown in FIG. 1. For example, the computer system 100 may include at least a portion of I/O devices connected to the I/O interface 150, or may further include other components, for example, a transceiver, a global positioning system (GPS) module, a camera, a variety of sensors, and a database. In detail, if the computer system 100 is configured as a form of a mobile device such as a smartphone, the computer system 100 may be configured to further include a variety of components, for example, an accelerometer sensor, a gyro sensor, a camera, various physical buttons, a button using a touch panel, an I/O port, a vibrator for vibration, etc., which are generally included in the smartphone.

Figure 2:
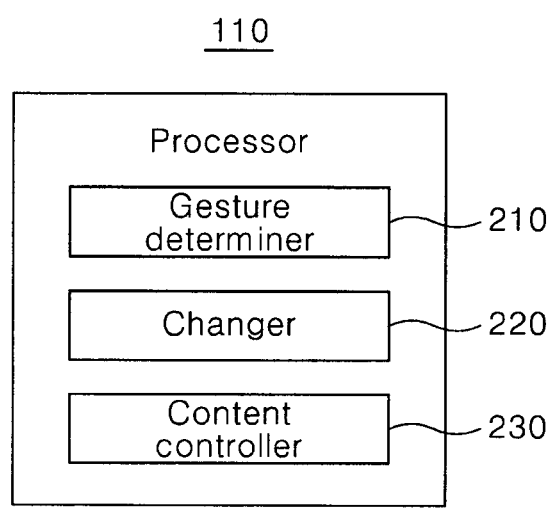
FIG. 2 is a block diagram illustrating an example of components includable in a processor of a computer system according to one embodiment.
Figure 3:
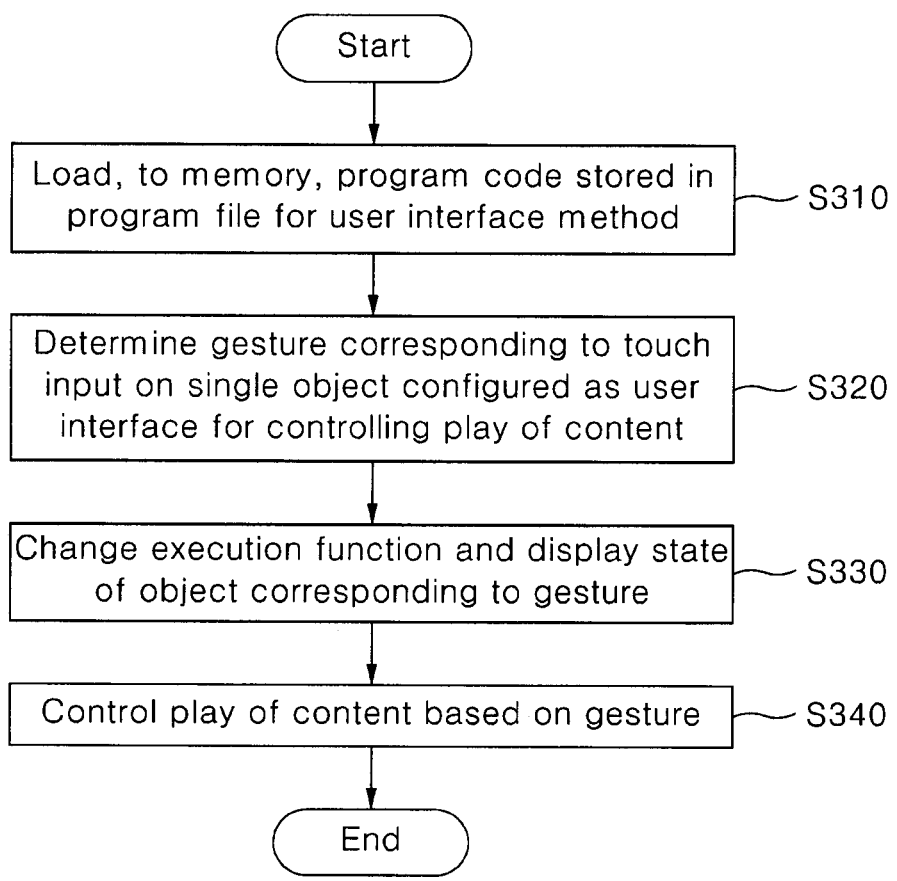
FIG. 3 is a flowchart illustrating an example of a user interface method performed by a computer system according to one embodiment.

FIG. 2 is a block diagram illustrating an example of components includable in the processor 110 of the computer system 100 according to one embodiment, and FIG. 3 is a flowchart illustrating an example of a user interface method performed by the computer system 100 according to one embodiment.

Referring to FIG. 2, the processor 110 includes a gesture determiner 210, a changer 220, and a content controller 230. The components or units of the processor 110 may be representations of different functions performed by the processor 110 in response to a control instruction provided from at least one program code. For example, the gesture determiner 210 may be used as a functional representation used by the processor 110 to control the computer system 100 to determine a gesture corresponding to a touch input from a user. The processor 110 and the components of the processor 110 may perform operations S310 through S340 included in the user interface method of FIG. 3. For example, the processor 110 and the components of the processor 110 may be configured to execute instructions according to a code of at least one program and a code of an OS included in the memory 120. Here, the at least one program code may correspond to a code of a program configured to process the user interface method.

The user interface method may not necessarily be implemented in illustrated order. Also, a portion of operations included in the user interface method may be omitted or an additional operation may be further included in the user interface method.

In operation S310, the processor 110 may load, in the memory 120, a program code stored in a program file for the user interface method. For example, the program file for the user interface method may be stored in the permanent storage device 130 of FIG. 1. The processor 110 may control the computer system 100 so that a program code may be loaded from the program file stored in the permanent storage device 130 to the memory 120. Here, the processor 110 and the gesture determiner 210, the changer 220, and the content controller 230 included in the processor 110 may be different representations of the processor 110 to perform operations S320 through S340 by executing an instruction corresponding to the program code loaded in the memory 120. To perform operations S320 through S340, the processor 110 and the components of the processor 110 may directly process an operation or may control the computer system 100 in response to a control instruction.

In operation S320, the gesture determiner 210 may determine a gesture performed by a user corresponding to a touch on a single object configured as a user interface and displayed on a user interface screen for controlling play of content. Here, the gesture determiner 210 may determine the user gesture based on a desired reference area on a user interface screen on which an object is displayed as a partial area of a touch screen. The gesture determiner 210 may determine the types of gestures based on the touch performed or applied on the object displayed on the touch screen. Examples of touch types may include a single tap, a double tap, a drag, a swipe, a flick, and a rotate. A single tap refers to a gesture for touching a touch screen once with a single finger and then immediately releasing the touch, and a double tap refers to a gesture for clicking the touch screen twice with a single finger within a preset period of time. A drag refers to a gesture for moving a finger while maintaining a touch on the touch screen without removing the finger. A motion made until a user removes the finger without a particular restriction on time or direction may be recognized as a dragging gesture. A swipe refers to a gesture for touching the touch screen with a finger and dragging the finger linearly on the screen. Although time is not particularly limited, a restriction such as a linear motion may be present. A rotate refers to a gesture for rotating an image, for example, from a vertical orientation of an object to horizontal, or from horizontal orientation to vertical and any angular degree in between. A flick refers to a gesture for pushing in one direction faster than a swipe. The gesture types are provided as examples only. In addition, in the case of a gesture type having a consecutive input form of a drag, a swipe, a flick, a rotate, etc., the gesture determiner 210 may further determine at least one of movement direction, movement distance, and movement speed according to the touch input.

In operation S330, the changer 220 may change the execution function and the display state of the object corresponding to the gesture determined in operation S320. The changer 220 may allow various functions of the object to interact with a single user gesture on the touch screen and may specify, for the object, an execution function corresponding to the gesture among various functions associated with the control of the content. Here, the changer 220 may specify the execution function corresponding to the user gesture based on the current play state of the content, for example, whether the content is being played. That is, the execution function specified for the object may be determined based on the user gesture and the current play state of the media or multimedia content.

Table 1 shows examples of execution functions specified for the object for each gesture.

TABLE 1

| Gesture | Play state | Execution function |
|---|---|---|
| 1. single tap | not playing | 1-1. Play |
|  | playing | 2-2. Pause |
| 2. up/down drag | not playing | 2-1. sound source download function execution |
|  | playing | 2-2. volume control |
| 3. left/right drag | not playing | 3-1. previous/next song |
|  | playing | 3-2. Seeking |
| 4. left/right flick | not playing | 4-1. playlist display control |
|  | playing | 4-2. playback speed control |
| 5. left/right swipe | not playing | 5-1. dictionary function execution |
|  | playing | 5-2. equalizer selection control |

Referring to Table 1, (1) in the case of single tapping the object, an execution function of the object may be specified as (1-1) 'play' that is a function for playing a sound source if content is not currently being played and may be specified as (1-2) 'pause' that is a function for pausing play of the sound source if the content is currently being played. (2) In the case of dragging the object up/down, the execution function of the object may be specified as (2-1) 'sound source download function execution' that is a function for moving to a page allowing download of the sound source if the content is not currently being played and may be specified as (2-2) 'volume control' that is a function for adjusting a volume of the sound source if the content is currently being played. (3) In the case of dragging the object to the left/right, the execution function of the object may be specified as (3-1) 'previous/next song' that is a function for selecting a previous or next sound source on a playlist if the content is not currently being played and may be specified as (3-2) 'seeking' that is a function for moving forward or backward at a desired interval based on a current play point of a sound source currently being played if the content is currently being played. (4) In the case of flicking the object to the left/right, the execution function of the object may be specified as (4-1) 'playlist display control' that is a function for displaying a playlist if the content is not currently being played and may be specified as (4-2) 'playback speed control' that is a function for adjusting a playback speed of a sound source currently being played if the content is currently being played. (5) In the case of swiping the object to the left/right, the execution function of the object may be specified as (5-1) 'dictionary function execution' that is a function for moving to a dictionary search page if the content is not currently being played and may be specified as (5-2) 'equalizer selection control' that is a function for changing an equalizer setting if the content is currently being played. For example, 'equalizer selection setting' is a function that is easily applicable to a selected equalizer while moving in order of a preset if the preset includes 'Voice Only, Bgm Only, Custom'.

The execution functions based on gestures are preset and Table 1 is provided as an example only and may be modified based on the type or the characteristics of the content.

If the content (i.e., media or multimedia) is being played on the computer system 100 and, in this instance, the first function of an object, for example, 'pause', is dragged to the right from a desired reference area on the user interface screen, the changer 220 may change the previous execution function, for example, the first function, of the object to a second function, for example, 'seeking', while maintaining the reference area.

In the case of a user gesture type having consecutive touch input forms including a drag, a swipe, a flick, a rotate, etc., an execution level or size of a function specified for the object may be changed based on movement distance or movement speed according to a touch input. For example, in the case of 'seeking', the movement interval of a play point or location of a sound source may vary to be proportional to the movement distance or the movement speed of a drag.

The changer 220 may move the object displayed on the reference area of a user interface screen in response to the gesture determined in operation S320, while maintaining the reference area. The changer 220 may apply an animation effect corresponding to the gesture to a display state of the object. Here, the changer 220 may apply an image change corresponding to at least one of movement direction, movement distance, and movement speed according to a touch input. Also, the changer 220 may display a symbol, for example, '□' for the 'play' function, representing a corresponding function on the object as information associated with an execution function specified for the object. That is, a value changed due to the touch input may be represented as an image change of the object, a real-time progress bar, a number, a symbol, and the like.

In operation S340, the content controller 230 may perform a preset operation based on the gesture determined in operation S320. For example, the content controller 230 may control play of the content based on the execution function changed for the object. The content controller 230 may perform a preset operation, that is, the execution function specified for the object in operation S330 based on the gesture for the object. Here, the content controller 230 may perform an operation corresponding to the movement direction of the gesture as the execution function specified for the object and may also perform the corresponding operation at intensity corresponding to at least one of the movement distance and the movement speed of the gesture. For example, in response to the gesture that drags the object to the right, the content controller 230 may make a play point of sound source currently being played move forward by a desired interval based on a current play point of the sound source. In response to the gesture that drags the object to the left, the content controller 230 may make the play point of the sound source move backward by a desired interval based on the current play point. Here, according to an increase in the movement distance or the movement speed of the gesture, an interval for moving the play point of the sound source may increase.

Figure 4:
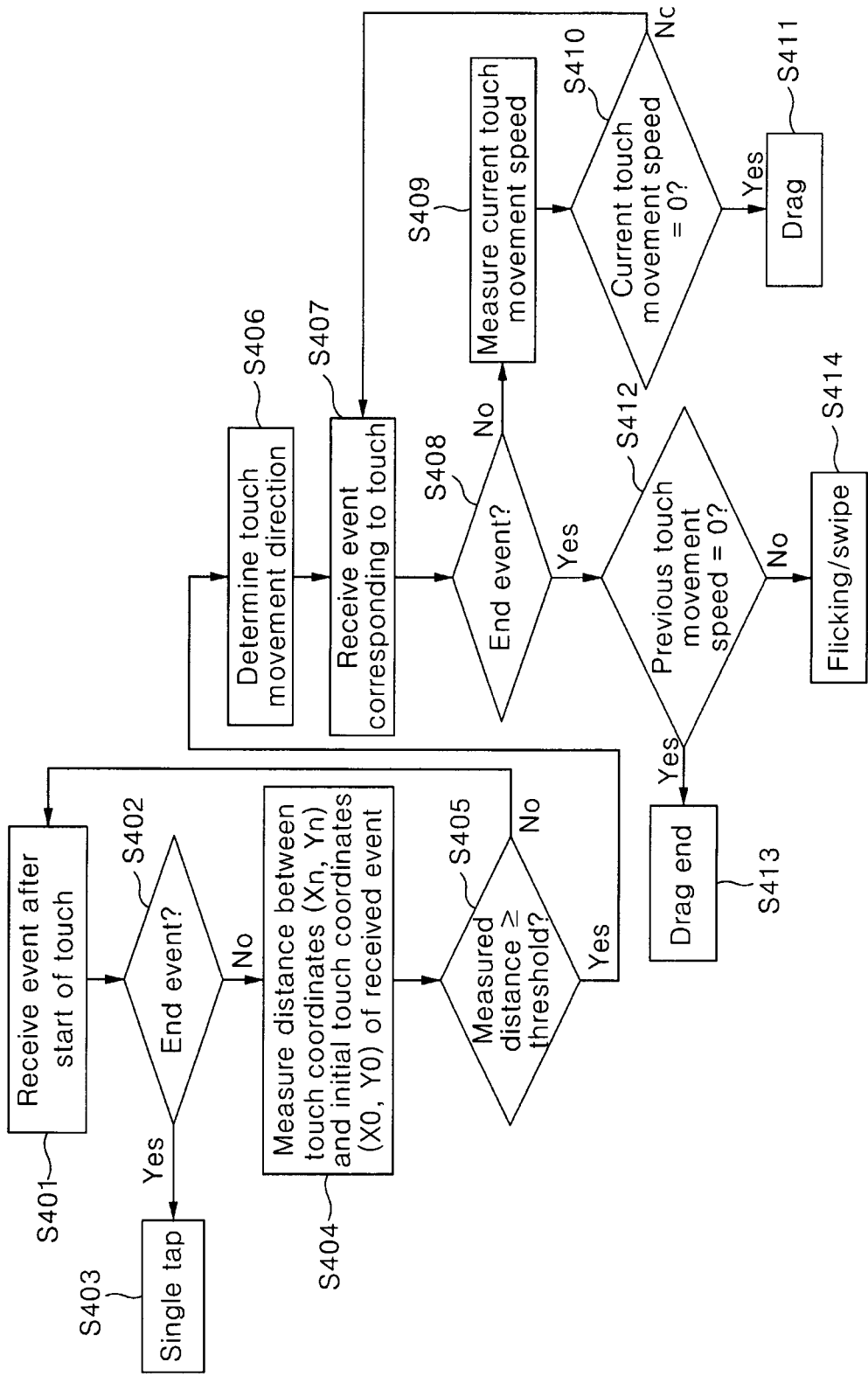
FIG. 4 is a flowchart illustrating an example of a process of classifying types of gestures according to one embodiment.

FIG. 4 is a flowchart illustrating an example of a process of classifying types of gestures according to at least one example embodiment.

Referring to FIG. 4, the gesture determiner 210 may receive an event associated with a touch and may receive touch coordinates at intervals of a desired time, for example, every 50 msec, from a point in time at which the touch is made to a point in time at which the touch is removed. Here, the gesture determiner 210 may be aware of the start and the end of the touch from the event.

In response to receiving the event after a touch in operation S401, the gesture determiner 210 determines whether the received event is an end event in operation S402. If the received event is determined to be the end event, the gesture determiner 210 may classify a gesture corresponding to the touch input as a single tap in operation S403.

If the received event is determined not to be the end event, the gesture determiner 210 may measure a distance between touch coordinates (Xn, Yn) of the event received in operation S401 and initial touch coordinates (X0, Y0) at which the touch is started in operation S404.

In operation S405, the gesture determiner 210 determines whether the distance measured in operation S404 is greater than or equal to a threshold. If the measured distance is less than the threshold, the gesture determiner 210 determines the touch type as a pause state and returns to operation S401 and repeats the above process.

If the measured distance is greater than or equal to the threshold, the gesture determiner 210 determines the touch type as a moving state and determines and stores the movement direction of the touch, for example, one of four directions, up, down, left, and right, in operation S406.

Here, the gesture determiner 210 measures and stores the current touch movement speed.

If the received touch coordinates include {(X0, Y0) (initial touch coordinates), . . . , (Xn-2, Yn-2), (Xn-1, Yn-1), (Xn, Yn) (current touch coordinates)}, the gesture determiner 210 may measure the current touch movement speed by using an X coordinate value for a left-right movement speed and using a Y coordinate value for an up-down movement speed.

For example, the current touch movement speed for the left-right movement may be calculated according to Equation 1.

Current touch movement speed $(px/ms)=(X_n-X_{n-1})/$ threshold time (for example, 50 msec)     [Equation 1]

If the received event is not the end event, the movement speed is zero or more. Accordingly, the event may be recognized as a drag corresponding to a continuous touch movement.

In response to receiving an event at a point in time at which the touch type is determined as the moving state, that is, at a point in time at which the distance measured in operation S404 is greater than or equal to the threshold in operation S404, the gesture determiner 210 determines whether the received event is the end event in operation S408. Here, if the received event is determined not to be the end event, the gesture determiner 210 measures and stores the current touch movement speed in operation S409. A scheme of measuring the touch movement speed is the same as the aforementioned method including Equation 1.

In operation S410, the gesture determiner 210 determines whether the current touch movement speed measured in operation S409 is zero. If the current touch measurement speed is zero, the gesture determiner 210 may classify a gesture corresponding to the touch input as a drag in operation S411. That is, if the event received in operation S407 is not the end event and the current touch movement speed measured in operation S410 is zero, the gesture determiner 210 may determine the corresponding gesture type as the drag.

If the current touch movement speed measured in operation S409 is not zero, the gesture determiner 210 returns to operation S407 and repeats the above process.

If the event received in operation S407 is the end event, the gesture determiner 210 determines whether a previous touch movement speed is zero in operation S412.

For example, the previous touch movement speed for the left-right movement is calculated according to Equation 2.

Previous touch movement speed $(px/ms)=(X_{n-1}-X_{n-2})/$threshold time (for example, 50 msec)     [Equation 2]

Every time touch coordinates are received, a touch movement speed may be measured and stored for a subsequent process. The previous touch movement speed may be read from the stored values and used.

If it is determined that the event received in operation S407 is the end event and the previous touch movement speed is zero, the gesture determiner 210 may recognize the gesture according to the touch input as the end of a drag in operation S413.

If it is determined that the event received in operation S407 is the end event and the previous touch movement speed is not zero, the gesture determiner 210 may classify the gesture corresponding to the touch input as a flick or a swipe in operation S414. Here, the gesture determiner 210 may verify a speed change between the current touch movement speed and the previous touch movement speed, and may classify the corresponding gesture type as a flick in response to no sign change and an increase in an absolute value and may classify the corresponding gesture type as a swipe in response to no sign change and a decrease in the absolute value.

Accordingly, the gesture determiner 210 may recognize the start and the end of a touch through an event, and may classify a gesture type based on touch movement distance using touch coordinates, touch movement direction, touch movement speed, etc.

FIGS. 5 through 11 illustrate examples off a user interface screen according to at least one example embodiment.

Figure 5:
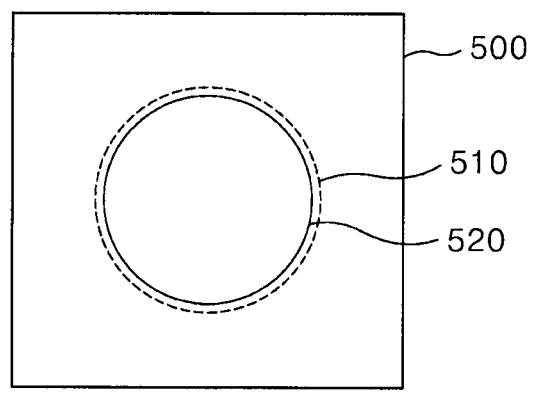
FIGS. 5 through 11 illustrate examples of a user interface screen according to at least one example embodiment.

Referring to FIG. 5, a user interface screen 500 may be configured as a touch screen for receiving a touch of a user as an input, and may include a reference area 510 that is a specific area displayed on the touch screen and a single object 520, that is, a user interface, for controlling play of content. Here, the reference area 510 is fixably displayed on the touch screen and the object 520 is displayed on the reference area 510 as a target that is touchable and controllable by the user.

Figure 6:
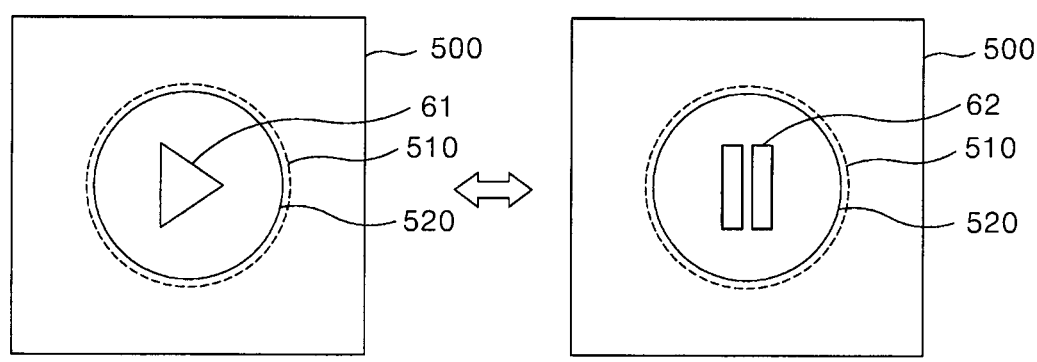

Referring to FIG. 6, in an initial state in which the user interface screen 500 is displayed on the computer system 100 and the content is not played, a 'play' function may be specified for the object 520 and a first symbol 61 representing the 'play' function may be displayed on the object 520.

If the user single taps the object 520 for which the 'play' function is specified, play of the content starts. Here, a previous function specified for the object 520 may be changed from the 'play' function to a 'pause' function and a second symbol 62 representing the 'pause' function may be displayed on the object 520.

If the user single taps the object 520 for which the 'pause' function is specified, the play of the content is paused. Here, the previous function specified for the object 520 may be changed again from the 'pause' function to the 'play' function and the first symbol 61 representing the 'play' function may be displayed again on the object 520.

The 'play' function and the 'pause' function may be alternately applied as the first function that is an initial function specified for the object 520, depending on whether to play the content by single tapping the object 520. That is, the first function of the object 520 may be specified as the 'play function' if the object is not being played and may be specified as the 'pause' function if the content is being played.

In response to an input of a gesture, for example, a drag, a swipe, a flick, a rotate, etc., performed on the object 520 of which the first function is specified, the first function of the object 520 is changed with a second function corresponding to the input gesture and, at the same time, the second function is immediately executed. Once the execution of the second function is completed, an execution function of the object may be changed again to the first function that is a previous initial function.

Figure 7:
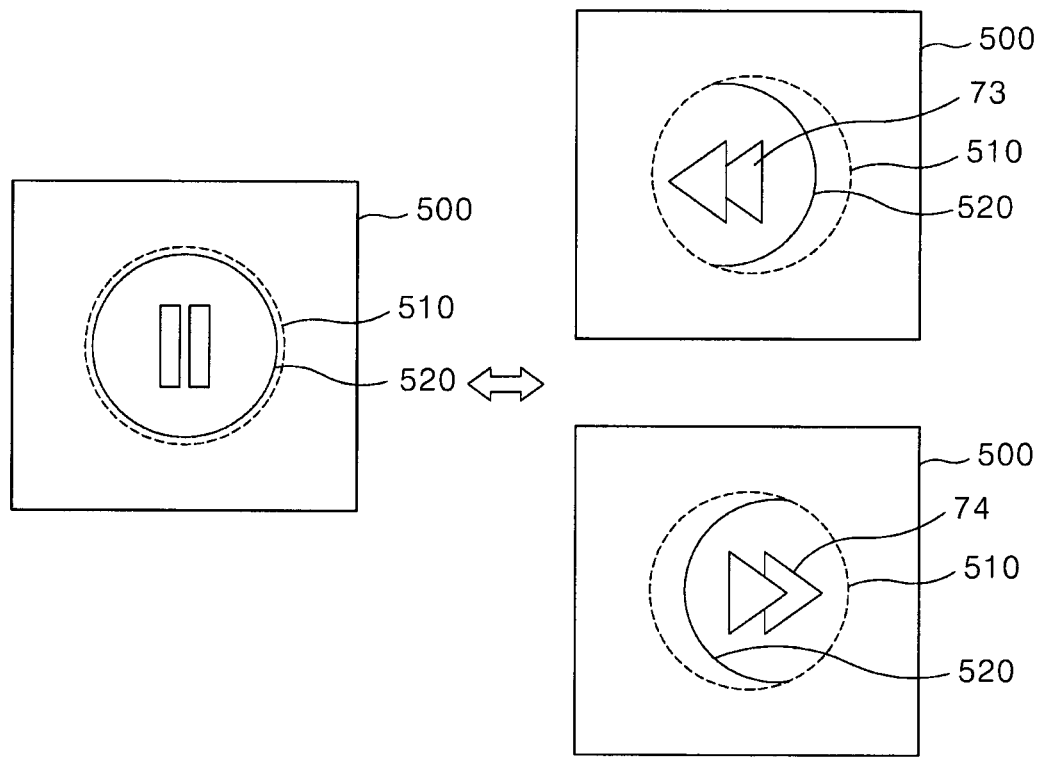

Referring to FIG. 7, if the user drags, to the left, the object 520 for which the 'pause' function' corresponding to the first function is specified (the content is currently being played), the 'pause' function, which is the previous function specified for the object 520, may be changed to a 'backward' function and a third symbol 73 representing the 'backward' function may be displayed on the object 520. At the same time at which the execution function of the object 520 is changed from the 'pause' function to the 'backward' function, a play point of the content being played may move backward by a desired interval in response to the changed function.

If the user drags, to the right, the object 520 for which the 'pause' function' corresponding to the first function is specified (the content is currently being played), the 'pause' function, which is the previous function specified for the object 520, may be changed to a 'forward' function and a fourth symbol 74 representing the 'forward' function may be displayed on the object 520. At the same time at which the execution function of the object 520 is changed to the 'forward' function, a play point of the content being played may move forward by a desired interval in response to the changed function.

If the execution function of the object 520 is changed from the 'pause' function to the 'backward' function or the 'forward' function, the execution function of the object 520 is changed again to the 'pause' function that is the previous initial function at a point in time at which execution of the changed function is completed.

Figure 8:
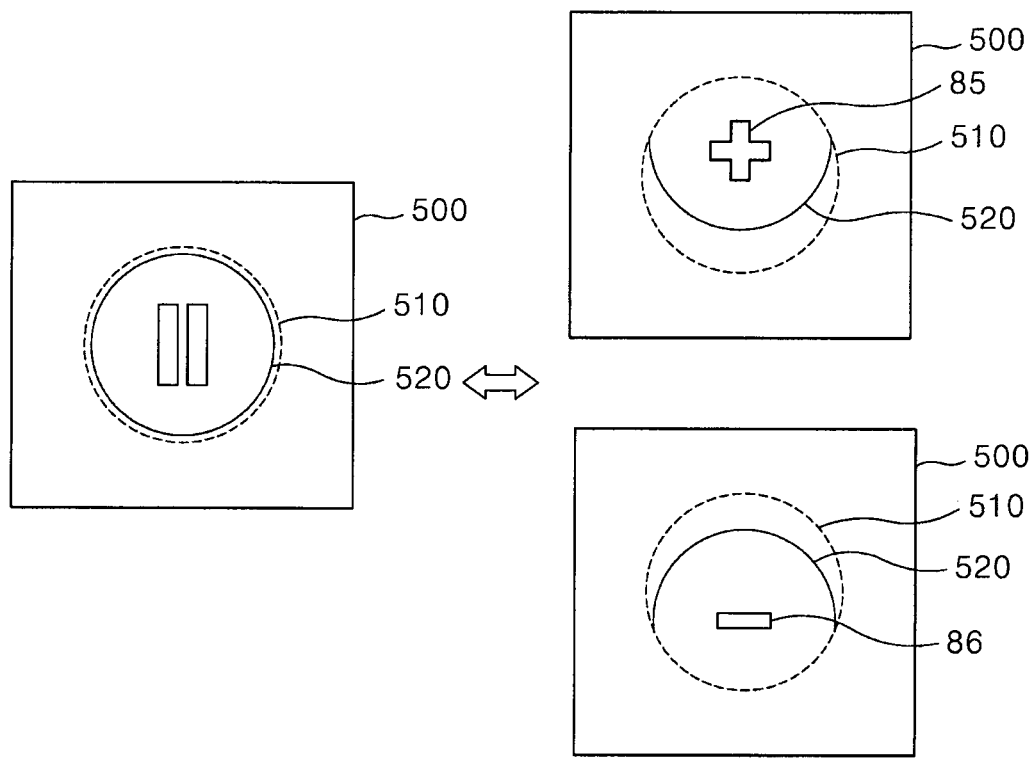

Referring to FIG. 8, if the user drags up the object 520 for which the 'pause' function corresponding to the first function is specified (the content is currently being played), the 'pause' function, which is the previous function specified for the object 520, may be changed to a 'volume up' function and a fifth symbol 85 representing the 'volume up' function may be displayed on the object 520. At the same time at which the execution function of the object 520 is changed from the 'pause' function to the 'volume up' function, a volume of the content being played may increase by a desired level in response to the changed function.

If the user drags down the object 520 for which the 'pause' function corresponding to the first function is specified (the content is currently being played), the 'pause' function, which is the previous function specified for the object 520, may be changed to a 'volume down' function and a sixth symbol 86 representing the 'volume down' function may be displayed on the object 520. At the same time at which the execution function of the object 520 is changed from the 'pause' function to the 'volume down' function, a volume of the content being played may decrease by a desired level in response to the changed function.

If the execution function of the object 520 is changed from the 'pause' function to the 'volume up' function or the 'volume down' function, the execution function of the object 520 is changed again to the 'pause' function, the previous function specified for the object 520, at a point in time at which execution of the changed function is completed.

Instead of applying an up/down drag, it is possible to apply another gesture type, for example, a rotate, to change to the 'volume up' function and the 'volume down' function.

Figure 9:
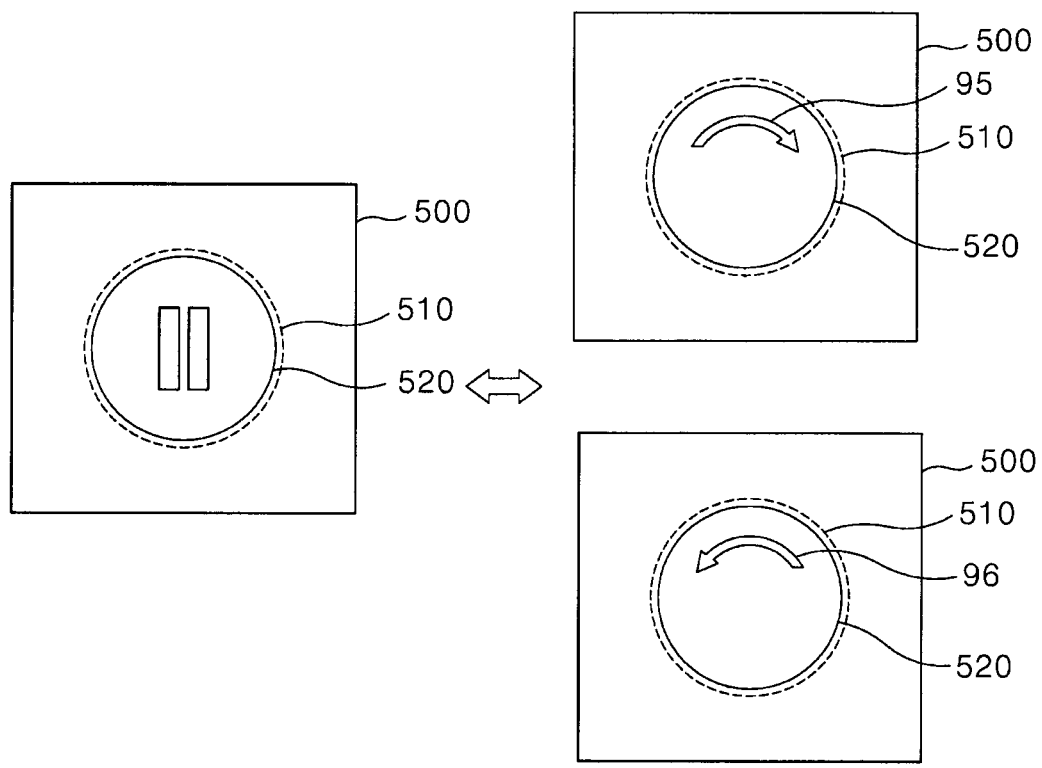

Referring to FIG. 9, if the user rotates clockwise the object 520 for which the 'pause' function corresponding to the first function is specified (the content is currently being played), the 'pause' function, which is the previous function specified for the object 520, may be changed to a 'volume up' function and a fifth symbol 95 representing the 'volume up' function may be displayed on the object 520.

If the user rotates counterclockwise the object 520 for which the 'pause' function corresponding to the first function is specified (the content is currently being played), the 'pause' function, which is the previous function specified for the object 520, may be changed to a 'volume down' function and a sixth symbol 96 representing the 'volume down' function may be displayed on the object 520.

Figure 10:
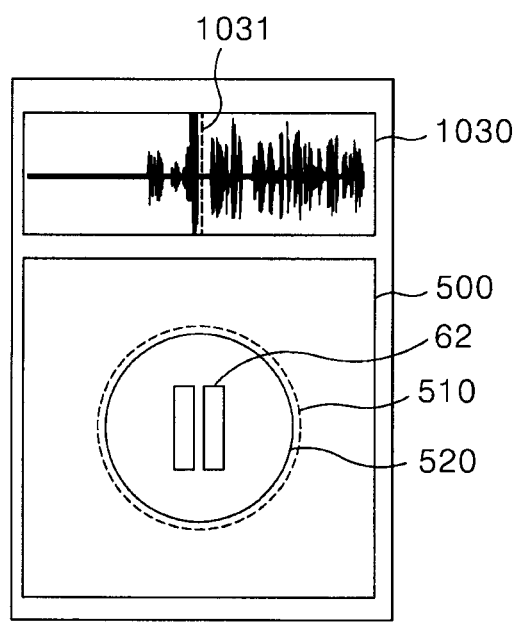

Referring to FIG. 10, the computer system 100 may provide a progress bar 1030 indicating a play point of the content with the user interface screen 500 for controlling the content. Here, if the content is being played, the execution function of the object 520 may be specified as the 'pause' function and the second symbol 62 representing the 'pause' function may be displayed on the object 520. The progress bar 1030 may include a basic bar 1031 indicating the current play location of the content being played.

While the content is currently being played, a 'repeat' function of designating at least a portion of an entire play section of the content and repeating the designated section may interact with the object 520.

Figure 11:
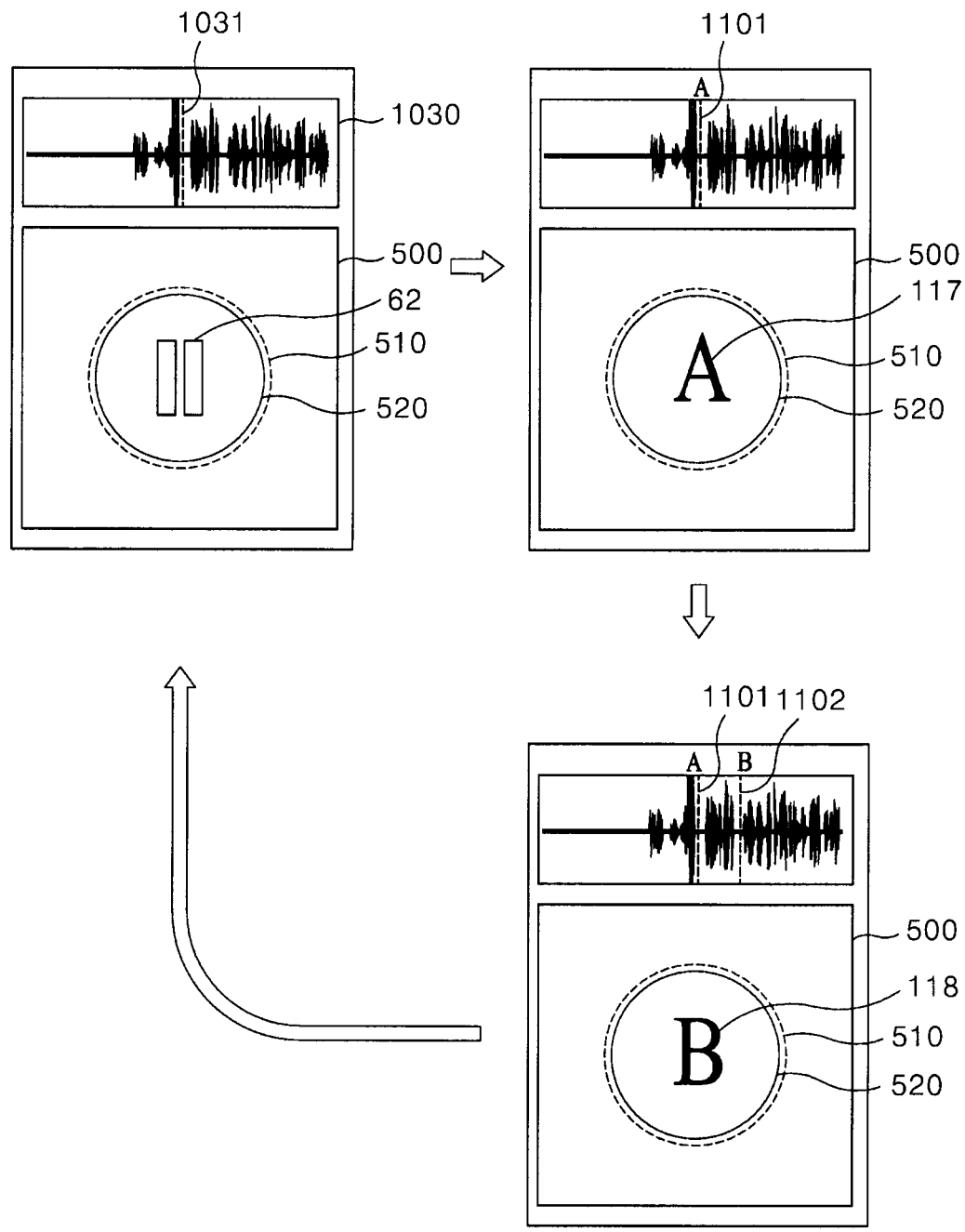

Referring to FIG. 11, if the user double taps the object 520 for which the 'pause' function is specified, the 'pause' function, which is the previous function specified for the object 520, may be changed to a 'point A selection' function for designating a point A 1101 that is a point at which a section desired to be repeated starts and a seventh symbol 117 representing the 'point A selection' function may be displayed on the object 520. At the same time at which the execution function of the object 520 is changed from the 'pause' function to the 'point A selection' function, the current play location of the content being played may be set to the point A 1101 in response to the changed function.

If the user double taps the object 520 for which the 'point A selection' function is specified in a state in which the current play location of the content has moved forward or backward based on the point A 1101, the 'point A selection', which is the previous function specified for the object 520, may be changed to a 'point B selection' function for designating a point B 1102, which is a point at which the section desired to be repeated ends, and an eighth symbol 118 representing the 'point B selection' function may be displayed on the object 520. At the same time at which the execution function of the object 520 is changed from the 'point A selection' function to the 'point B selection' function, the current play location of the content being played may be set to the point B 1102 in response to the changed function.

Once a start point, for example, the point A 1101, and an end point, for example, the point B 1102, of the section desired to be repeated are designated, a section from the start point, for example, the point A 1101, to the end point, for example, the point B 1102, of the entire play section of the content may be repeatedly played.

If the user double taps the object 520 for which the 'point B selection' function is specified, a section repeat play may be cancelled. At the same time, the 'point B selection' function, which is the previous function specified for the object 520, may be changed again to the 'pause' function and the second symbol 62 representing the 'pause' function may be displayed again on the object 520.

The gestures and the execution functions for each gesture described with FIGS. 5 through 11 are provided as examples only. All of the gestures recognizable at the computer system 100 and all of the functions configurable at the computer system 100 may correspond to each other and thereby be applied.

As described above, a different gesture type may be predefined for each execution function associated with control of content, and various functions may interact in association with a single object by specifying an execution function corresponding to a gesture for the object based on a gesture type corresponding to a touch input of a user.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A user interface method using a computer for interfacing with a user through a user interface screen, the method comprising:
displaying an object in a desired reference area included on the user interface screen for controlling a first function of starting a play of a content when a first predetermined user gesture is detected on the object and a second function of stopping the play of the content when a second predetermined user gesture is detected on the object;
detecting a third predetermined user gesture, different from the first and second predetermined user gestures, performed on the object displayed in the desired reference area during the play of the content; and
executing a third function of controlling a volume of the content during the play of the content in response to the third predetermined user gesture being performed on the object,
wherein the third predetermined user gesture is an upward or a downward drag motion on the object which changes an image of the object to indicate that the volume of the content is being raised or lowered.

2. The method of claim 1,
wherein the image change of the object corresponds to at least one of a movement direction, a movement distance, and a movement speed of the third predetermined user gesture when the third predetermined user gesture is detected.

3. The method of claim 1, wherein the detecting of a user gesture of the first, second third and predetermined user gestures comprises:
measuring a distance between initial touch coordinates of an event received in response to a touch input on the object and current touch coordinates;
determining whether an event received after a point in time at which the measured distance is greater than or equal to a threshold is an end event corresponding to a touch release;
measuring a current touch movement speed in response to the event received after the point in time at which the measured distance is greater than or equal to the threshold being determined not to be the end event; and
classifying a type of the user gesture of a corresponding first, second and third predetermined user gestures as a drag in response to the current touch movement speed being zero.

4. The method of claim 3, wherein the detecting of a user gesture of the first, second third and predetermined user gestures comprises:
verifying a previous touch movement speed of the end event in response to the event received after the point in time at which the measured distance is greater than or equal to the threshold being determined to be the end event; and
classifying the type of the user gesture of a corresponding first, second and third predetermined user gestures as a flick or a swipe in response to the previous touch movement speed not being zero.

5. The method of claim 4, wherein the classifying of the type of the user gesture as the flick or the swipe comprises:
classifying the type of the user gesture as the flick in response to an increase in a speed change between the previous touch movement speed and the current touch movement speed; and
classifying the type of the user gesture as the swipe in response to a decrease in the speed change between the previous touch movement speed and the current touch movement speed.

6. A non-transitory computer-readable recording medium storing instructions that, when executed by a processor, cause the processor to perform a user interface with a user through a user interface screen, comprising:
displaying an object in a desired reference area included on the user interface screen for controlling a first function of starting a play of a content when a first predetermined user gesture is performed on the object and a second function of stopping the play of the content when a second predetermined user gesture is performed on the object;

detecting a third predetermined user gesture, different from the first and second predetermined user gestures, performed on the object displayed in a desired reference area during the play of the content; and executing a third function of controlling a volume of the content during the play of the content in response to the third predetermined user gesture being performed on the object, wherein the third predetermined user gesture is an upward or a downward drag motion on the object which changes an image of the object to indicate that the volume of the content is being raised or lowered.

7. A user interface system configured as a computer for interfacing with a user, the user interface system comprising:

a user interface screen for displaying an object in a desired reference area included on the user interface screen for controlling a first function of starting a play of a content when a first predetermined user gesture is detected on the object and a second function of stopping the play of the content when a second predetermined user gesture is detected on the object; and at least one processor configured to execute non-transitory computer-readable instructions, wherein the at least one processor comprises:

a gesture determiner configured to detect a third predetermined user gesture, different from the first and second predetermined user gestures, performed on the object displayed in the desired reference area during the play of the content; and a content controller configured to execute a third function of controlling a volume of the content during the play of the content in response to the third predetermined user gesture being performed on the object, wherein the third predetermined user gesture is an upward or a downward drag motion on the object which changes an image of the object to indicate that the volume of the content is being raised or lowered.

8. The user interface system of claim 7, further comprising:

a changer configured to apply the image change to the object, the image change corresponding to at least one of a movement direction, a movement distance, and a movement speed of the third predetermined user gesture when the third predetermined user gesture is detected.

9. The user interface system of claim 7, wherein the gesture determiner is configured to measure a distance between initial touch coordinates of an event received in response to a touch input on the object and current touch coordinates, determine whether an event received after a point in time at which the measured distance is greater than or equal to a threshold is an end event corresponding to a touch release, measure a current touch movement speed in response to the event received after the point in time at which the measured distance is greater than or equal to the threshold being determined to not be the end event, and classify a type of a user gesture of a corresponding first, second third and predetermined user gestures as a drag in response to the current touch movement speed being zero.

10. The user interface system of claim 9, wherein the gesture determiner is configured to verify a previous touch movement speed of the end event in response to the event received after the point in time at which the measured distance is greater than or equal to the threshold being determined to be the end event, and classify the type of the user gesture of a corresponding first, second and third predetermined user gestures as a flick or a swipe in response to the previous touch movement speed not being zero.

11. The user interface system of claim 10, wherein the gesture determiner is configured to classify the type of the user gesture as the flick in response to an increase in a speed change between the previous touch movement speed and the current touch movement speed, and classify the type of the user gesture as the swipe in response to a decrease in the speed change between the previous touch movement speed and the current touch movement speed.

* * * * *